Nov. 12, 1968   O. KARSTEN   3,410,102
LEAK INDICATOR FOR LIQUID-COOLED MACHINES
Filed March 28, 1966
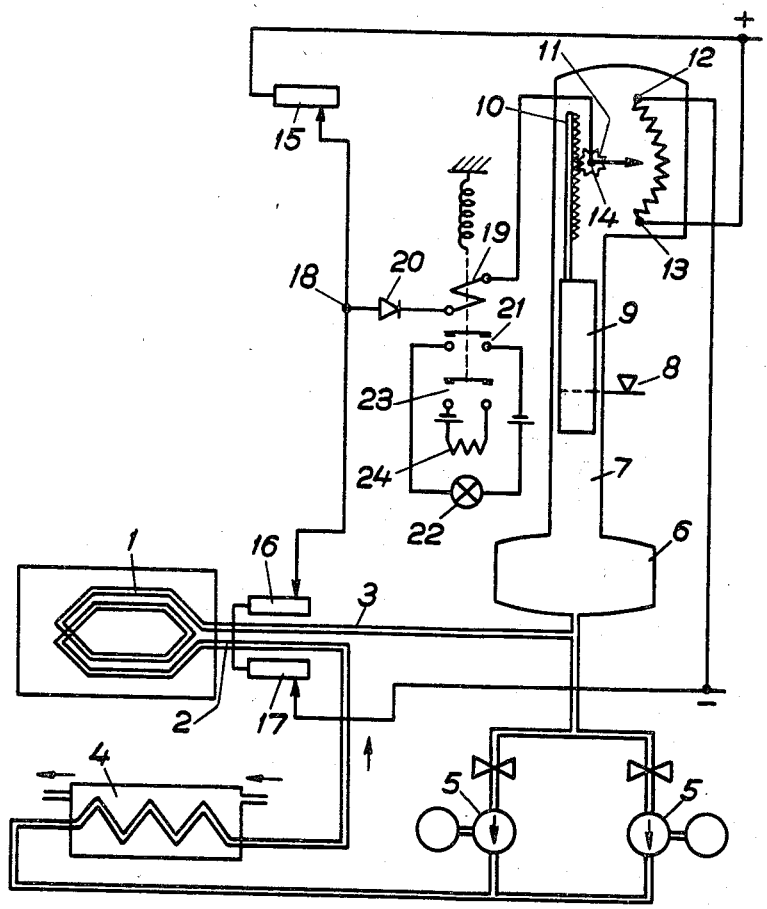
INVENTOR.
OLAV KARSTEN
BY
Bailey, Stephens + Huettig
ATTORNEYS

United States Patent Office 3,410,102
Patented Nov. 12, 1968

3,410,102
LEAK INDICATOR FOR LIQUID-COOLED MACHINES
Olav Karsten, Vasteras, Sweden, assignor to Allmänna Svenska Elektriska Aktiebolaget, Vasteras, Sweden, a corporation of Sweden
Filed Mar. 28, 1966, Ser. No. 538,027
Claims priority, application Sweden, Apr. 6, 1965, 4,402/65
2 Claims. (Cl. 62—129)

ABSTRACT OF THE DISCLOSURE

Leak indicator for a closed cooling circuit intended for momentary indication of a small leakage, comprising temperature-independent level indicator means and a temperature sensitive transducer arranged in heat-exchange relation with the coolant. Electrical output signals from the transducer and the level indicator exert opposite influence on a signal means in such a way that the signal means gives no signal in response to alterations due to changing temperature.

---

The present invention relates to a leak indicator for liquid-cooled machines particularly generators, in which a liquid-cooling medium subjected to overpressure circulates in a closed cooling circuit which is provided with a gauge tube intended for indication of the liquid level.

It is known to use a constant liquid level in a gauge tube as a proof that a system filled with a liquid is without any leakage and it is also known to avoid the need of direct observation of the tube by providing it with floats which influence the contacts of an electrical device for alarm, release of breakers, or the like. When dealing with the liquid in a cooling system, the leak indication is complicated by the fact that the liquid is subject to great variations in temperature and accordingly also in volume and liquid level. The problem is then to distinguish between a decrease in volume which is caused by a reduction of temperature and a decrease which is due to a leakage of cooling liquid.

In a known device it has been proved possible to make a leak indication mainly independent of the temperature by connecting an expansion container with a cross section approximately 1000 times bigger than that of the gauge tube to the same conduit as the gauge tube by means of a magnet valve controllable by a temperature-sensitive transducer. If the float mechanism of the gauge tube is to be able to react to the leakage as soon as it occurs, the said magnet valve has to be closed at that moment. On the other hand, it is necessary that the magnet valve with decreasing temperature is opened occasionally for short time intervals by means of a control signal from the temperature-sensitive transducer, so that such decreases in volume as are due to decreasing temperature, may be compensated by a corresponding reduction of the liquid level of the expansion container. The known device has the drawback that it does not give any leak indication if the leakage takes place during decreasing temperature and is so small that the magnet valve opens before the alarm level has been reached. Furthermore the known device calls for many and complicated components.

A safer and more simple leak indication is obtained with the device according to the invention which is based on the principle of providing the gauge tube with an electrical level indicator, and, in order to obtain compensation for temperature dependent variations of the output of the level indicator, using temperature dependent electric components which are arranged in heat conducting contact with the cooling medium.

A device according to the invention is characterised in that a controllable voltage source, the output voltage of which is dependent on the liquid level of the gauge tube, is connected to an electric alarm and/or releasing device, the current supply of which furthermore is dependent on the temperature of at least one temperature dependent resistor arranged in heat conducting contact with the cooling medium.

An embodiment of the invention will be described with reference to the enclosed drawing where 1 is the winding of a direct cooled generator, 2 the supply conduit for a liquid cooling medium and 3 the return conduit. The cooler 4 and the circulation pumps 5 form together with the cooling system of the generator and the expansion tank 6 a sealed system. The upper part of the expansion container is formed as a relatively thin gauge tube 7, and the level of the cooling liquid in the gauge tube is kept in the vicinity of the level 8 as long as no leakage occurs. In the top part of the gauge tube a quantity of inert gas, for example nitrogen, is confined under high pressure. In the gauge tube 7 there is a float 9, which operates a rack 10 upwards or downwards, when the liquid level changes. The rack 10 engages a gear wheel 11 which is mechanically connected to a potentiometer, the end terminals of which are marked 12 and 13 and are connected to the negative and positive bars respectively of a direct current network. The intermediate terminal of the potentiometer is denoted 14. Between the poistive and negative bars a voltage divider is also connected which comprises three series connected adjustable resistor elements 15, 16 and 17. The resistor 15 has a resistance which is mainly independent of the temperature, while the resistors 16 and 17 are wound with wire material, the resistivity of which increases with increasing temperature. The intermediate terminal 18 of the voltage divider is connected to the intermediate terminal 14 of the potentiometer through a relay coil 19 and a diode 20 which is series connected with the relay coil. The resistors 15, 16 and 17 are adjusted so that the voltage over the relay coil 19 is zero at normal working temperature of the generator. With decreasing temperature the contraction of the liquid makes the gear 11 rotate counter-clockwise, thereby reducing the voltage between the terminals 14 and 12. At the same time the resistance of the resistor elements 16 and 17 decreases, and thus the voltage between the negative bar and the intermediate terminal 18 sinks. When a temperature-dependent decrease in volume occurs, the potential fall at point 14 is thus compensated by a corresponding potential fall at point 18, so that the current through the relay coil 19 is still kept under the pickup value. If on the other hand the float 9 sinks due to the fact that a leak has occurred in the system, no compensation of the changed potentiometer ratio will take place and the increase of the potential at point 14 will make the current through the relay coil 19 reach a value sufficient for the closing of the contacts 21, so that the alarm device 22 is put into operation. If the leakage continues till a relatively large amount of water has leaked out, the contacts 23 are also closed and the coil 24 supplied with current which releases a device, not shown in the drawing, intended for putting the generator out of operation. As a relay pickup upon increasing temperature ought to be avoided, the relay coil 19 is series connected with a diode 20. As the resistor elements 16 and 17 are placed at a warm and cool place respectively in the cooling system and series connected, the total resistance can be brought to vary approximately proportionally with the volume of the cooling medium at varying temperature. If the total resistance at 16 and 17 is shown to have a tendency to become too low at high temperature, a better compensation can be adjusted by letting the resistor 16, which is the warmest constitute a greater part of the resulting resistance of the two series connected elements 16 and 17.

With the device shown on FIG. 1 it is hardly possible to obtain such an accurate adjustment that the voltage between the terminals 18 and 14 never deviates from zero. It may then be desirable to adjust the voltage divider 15, 16 and 17 so that said voltage always is directed in the blocking direction of the diode 20.

Instead of temperature-dependent resistor elements with positive characteristics, elements can be used, the resistance of which decreases when the temperature increases. It would then be necessary and sufficient to change the polarity of the potentiometer terminals 12 and 13.

I claim:

1. Leak indicator for a machine with a closed cooling circuit containing a liquid-cooling medium, said leak indictor comprising a gauge tube connected to said circuit, temperature-independent level indicator means including means to produce an electrical output signal, said level indicator means being associated with said gauge tube and responsive to the height of liquid therein, a temperature sensitive transducer with means to produce an electrical output signal, electrically controllable switching means, for giving a leakage signal, said temperature sensitive transducer being arranged in heat-exchange relation with said cooling medium, means to supply the output signals from said level indicator means and said temperature sensitive transducer to said switching means in opposition to each other, said signal giving means being connected to the output side of said switching means.

2. In a leak indicator according to claim 1, said indicator means including a potentiometer and a float operatively connected to the potentiometer, a direct current network having positive and negative bars, said potentiometer being connected between said bars, said temperature-sensitive transducer comprising a voltage divider connected between said bars, said voltage divider comprising at least one temperature-dependent component, said temperature-dependent component being arranged in heat-exchange relation with the cooling medium, the dividing ratio of said voltage divider thus being dependent on the temperature of the cooling medium, said switching means comprising a relay connected between the intermediate terminal of the potentiometer and an intermediate terminal of the voltage divider.

References Cited

UNITED STATES PATENTS 2,106,756  2/1938  Obermaier _____ 340—244

ROBERT A. O'LEARY, *Primary Examiner.*